Sept. 22, 1936.    G. W. MOORE    2,054,908
AUTOMATIC SYNCHRONIZER
Filed June 10, 1935
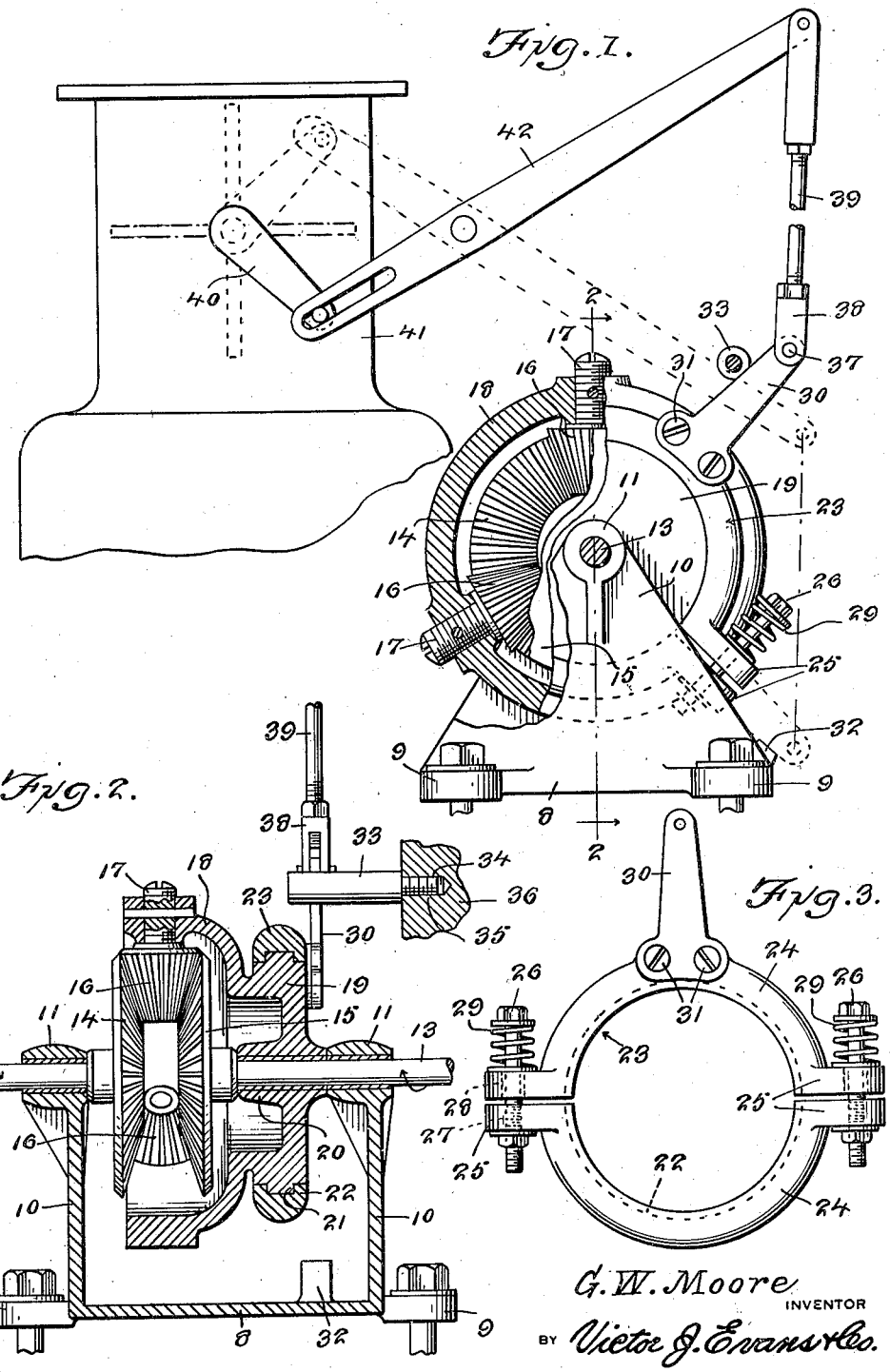
G. W. Moore
INVENTOR
BY Victor J. Evans & Co.
ATTORNEY Patented Sept. 22, 1936

2,054,908

UNITED STATES PATENT OFFICE 2,054,908

AUTOMATIC SYNCHRONIZER

Guy William Moore, Philadelphia, Pa.

Application June 10, 1935, Serial No. 25,875

1 Claim. (Cl. 60—97)

This invention relates to automatic synchronizers and has for an object to provide novel means for attaining the automatic sychronization of two internal combustion engines of the conventional type used on multimotored aircraft, whereby to minimize the development of dangerous vibrations and the unpleasant noise due to propellers turning at slightly different speeds, and to obviate the constant adjustment of the carburetor throttle-valves of the several engines as is at present required of the pilot in order to keep all engines turning at an equal speed.

A further object is to provide an automatic synchronizer of the class described which will be formed of a few, strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a side elevation of an automatic synchronizer constructed in accordance with the invention, with parts in section.

Figure 2 is a cross sectional view taken on the line 2—2 of Figure 1.

Figure 3 is a side elevation of the strap.

Assuming, for the sake of clarity, that two engines are employed, one will have its throttle valve manually controlled by the pilot, and will hereinafter be referred to as the leading engine, and the other engine will have its throttle-valve controlled by the leading engine by means of the automatic synchronizer, and will hereinafter be referred to as the following engine.

Referring now to the drawing in which like characters of reference designate similar parts in the various views, 8 designates a base plate which is provided with mounting lugs 9 and carries upright side members 10 which are provided with aligned bearings 11 adapted to receive oppositely rotatable shafts 12 and 13 driven respectively by the leading and the following engines. The shafts are equipped with respective differential side gears 14 and 15 and differential pinions 16, preferably three in number, mesh with these side gears and rotate freely about spindles 17 carried by a frame 18.

The frame 18, in the present embodiment of the invention, is shown as a dished shell, and has formed integral with one side a concentric sheave 19 which is provided with a bearing 20 that loosely receives the shaft 13 which is driven by the following engine. The frame is supported by the pinions 16 and by the bearing 20 which latter assures true alignment of the frame and pinions.

The sheave 19 is provided with a centrally located circumferential guide rib 21 which is received in a recess 22 formed in an annular strap 23. The strap is preferably formed of two arcuate sections 24 having laterally disposed lugs 25 which are bolted together by screw bolts 26. These bolts are screwed into threaded openings 27 in the lugs of one of the sections and project loosely through smooth bore openings 28 in the lugs of the other section. Compression springs 29 are confined on the bolts between the heads of the bolts and those lugs having the smooth bore openings. There is a clearance between opposed faces of the lugs of the two sections of the strap. By adjusting the screws the tension of the compression springs is controlled to effect desired frictional engagement between the strap and the sheave.

A radially extending arm 30 is secured to the strap by screws 31, or other connectors. The movement of the arm, as well as the movement of the strap, is limited by contact of the arm with spaced stops 32 and 33. The stop 32 is shown as a lug projecting from the base plate 8, and the stop 33 is shown as a pin provided with a reduced threaded shank 34 which is screwed into a threaded opening 35 formed in the following engine body indicated at 36.

The arm 30 is connected by a pin 37 to a yoke 38 carried by a rod or link 39 which may be connected direct to the throttle-valve of the following engine, or may be connected to the throttle valve 40 of the carburetor 41 of the following engine by a pivoted lever 42, as shown, or other lever arrangement.

The operation is as follows: The gear 14 is rotated by its shaft 12 which is driven from the leading engine through gears at a speed in any ratio to the engine speed desirable, such speed being preferably very much less than that of the engine. The gear 15 is rotated in a similar manner by the following engine, its speed bearing the same ratio to the speed of this engine as does the speed of the gear 14 to the speed of the leading engine. The gears 14 and 15 run in opposite directions to one another when in the position illustrated.

When after starting, the two gears 14 and 15 as stated will revolve in opposite directions. If the speed of the leading engine is greater than that of the following engine the pinions 16 will have planetary movement in the direction of rotation of the gear 14, carrying the arm 30 upward and thus opening the throttle-valve 40 of the following engine and increasing the speed of this engine, whereby the speed of the gear 15 will augment until it equals that of the gear 14. Should the speed of the gear 15 through some cause become greater than that of the gear 14, the pinions 16 will then move in the direction of rotation of the gear 15, thus causing the arm 30 to move downward, thereby reducing the amount of opening of the throttle-valve of the following engine until the speeds of the gears 14 and 15 are again uniform.

Should the speed of the following engine become either less or greater than that of the leading engine, it will be the cause of respectively increasing or decreasing the amount of opening of the throttle-valve of the following engine until its speed is uniform with that of the leading engine. Should the speed of the leading engine become either less or greater than that of the following engine, it will be likewise the cause of respectively decreasing or increasing the amount of opening of the throttle-valve on the following engine until the speed of this engine is uniform with the altered speed of the leading engine. In fact any variation of speeds between the two engines, brought about by internal conditions of one or the other of the engines, or by external conditions affecting their propellers, will cause such movement of the throttle-valve on the following engine, by means of the automatic synchronizing mechanism just described. as will eventually synchronize the speeds of both engines.

When the leading engine is being shut down and should it then come to rest before the following engine, the arm 30 will be carried in the same rotative direction as the gear 15 until it is arrested by the lower stop 32, but no undue strain or damage is caused to the throttle-valve as the sliding or slipping action provided for between the sheave 19 and the strap 23 permits the sheave to continue in this motion to any extent without affecting the throttle-valve and its connections.

When both engines are running with their throttle-valves fully open, should the leading engine, through some internal or external condition, increase its speed over that of the following engine, the consequent motion imparted to the sheave 19 and arm 30 will be arrested by contact of the arm with the upper stop 33, except in the case, of course, where the arm is already resting against this stop. In both cases the sheaves is free to rotate in this direction to any extent without damage. If the speed of the leading engine drops suddenly before that of the following engine, then the change will cause the herein described synchronizing apparatus to adjust the speed of the following engine instantly.

The condition noted above where at full throttle opening the speed of the leading engine exceeds that of the following engine, is extreme, and may seldom occur, and would then probably continue for a short time only before being corrected through manual control by the pilot.

From the above description it will be apparent that with the usual engine speeds used in flights of any distance, the synchronizer herein described will relieve the pilot of all supervision of engine speed for the purpose of synchronization. He will merely need to control the speed of one engine, and for the purpose of changing the speed only of the plane itself.

What is claimed is:

A speed synchronizer for a plurality of internal combustion engines comprising independently rotating shafts adapted to be driven by the engines, differential side gears on the shaft, differential pinions meshing with the gears, a dished shell frame supporting the pinions, a sheave integral with one side of the frame and having a bearing loosely receiving the shaft of one of the engines, a circumferential guide rib on the sheave, an annular strap having a recess receiving said rib, the strap being formed of two arcuate sections having laterally disposed lugs, bolts screwed into threaded openings in the lugs of one of the sections and projecting loosely through openings in the lugs of the other section, compression springs confined under compression between the heads of the bolts and the last named lugs, there being a clearance space between confronting lugs of both sections to permit adjustment of the tension of the springs to effect predetermined frictional engagement between the strap and the sheave, a laterally disposed arm on the strap, a lever mechanism for connecting the arm to the throttle of one of the engines to transmit movement of the strap to the throttle, and spaced stationary stops disposed in the path of movement of said arm for engaging said arm and permitting the strap to slip on the sheave when the arm has reached the end of its range of travel.

GUY WILLIAM MOORE.